US009602955B2

(12) United States Patent
Cronie et al.

(10) Patent No.: US 9,602,955 B2
(45) Date of Patent: Mar. 21, 2017

(54) CONCURRENT WIRELESS POWER TRANSFER AND DATA COMMUNICATION

(71) Applicant: Empire Technology Development LLC, Wilmington, DE (US)

(72) Inventors: Harm Cronie, Poliez-le-Grand (CH); Xudong Ma, New York, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/717,498

(22) Filed: May 20, 2015

(65) Prior Publication Data

US 2016/0345121 A1    Nov. 24, 2016

(51) Int. Cl.
    *H04B 5/00*    (2006.01)
    *H04W 4/00*    (2009.01)

(52) U.S. Cl.
    CPC .......... *H04W 4/008* (2013.01); *H04B 5/0031* (2013.01); *H04B 5/0037* (2013.01); *H04B 5/0075* (2013.01)

(58) Field of Classification Search
    CPC ............................. H04B 5/0031; H04B 5/0037
    USPC ....................... 455/41.1, 41.2, 41.3
    See application file for complete search history.

(56) References Cited

U.S. PATENT DOCUMENTS

| | | | | |
|---|---|---|---|---|
| 5,905,372 | A * | 5/1999 | Kuffner ................ | G06K 7/0008 323/356 |
| 8,427,300 | B2 | 4/2013 | Covaro et al. | |
| 8,664,801 | B2 | 3/2014 | Abe | |
| 2005/0220201 | A1* | 10/2005 | Laroia ................ | H04L 27/2637 375/260 |
| 2007/0143508 | A1 | 6/2007 | Linnman | |

(Continued)

FOREIGN PATENT DOCUMENTS

WO    PCT/US16/30944    7/2016

OTHER PUBLICATIONS

Boaventura, A.J.S., et al., "Spatial Power Combining of Multi-Sine Signals for Wireless Power Transmission Application," IEEE Transactions on Microwave Theory and Techniques, vol. 62, No. 4, pp. 1022-1030 (Apr. 2, 2014).

(Continued)

*Primary Examiner* — Wen Huang
(74) *Attorney, Agent, or Firm* — Workman Nydegger

(57) ABSTRACT

Systems and methods for concurrent wireless power transfer and data transmission are provided. A constraint encoder receives data bits for communication to a mobile device and encodes the data bits onto a transmit signal. The constraint encoder specifies signal constraints that cause the transmit signal to have a peak-to-power-average ratio (PAPR) during a given time interval sufficient to provide wireless power transfer to the mobile device. The system also includes a signal generator coupled to the constraint encoder. The signal generator generates the transmit signal according to the signal constraints. The system further includes a transmitter coil that is coupled to the signal generator. The transmitter coil is configured to transmit the transmit signal that has been encoded with the data bits to receiver coils of the mobile device. The encoded transmit signal is able to provide wireless power transfer and the encoded data bits to the mobile device.

38 Claims, 9 Drawing Sheets

(56) References Cited

U.S. PATENT DOCUMENTS

| | | | | |
|---|---|---|---|---|
| 2009/0110033 A1* | 4/2009 | Shattil | .................. | H04B 1/7174 |
| | | | | 375/141 |
| 2012/0235636 A1* | 9/2012 | Partovi | .................. | H02J 7/025 |
| | | | | 320/108 |
| 2013/0095759 A1* | 4/2013 | Andersen | ............. | G06K 7/0008 |
| | | | | 455/41.1 |
| 2013/0260676 A1* | 10/2013 | Singh | .................. | H04B 5/0037 |
| | | | | 455/41.1 |
| 2014/0194058 A1* | 7/2014 | Lee | ...................... | A61N 1/3787 |
| | | | | 455/41.1 |

OTHER PUBLICATIONS

Boaventura, A.S., and Carvalho, N.B., "Maximizing DC Power in Energy Harvesting Circuits Using Multisine Excitation," 2011 IEEE MTT-S Interntional Microwave Symposium Digest, pp. 1-4 (Jun. 5-10, 2011).

Knuth, D.E., "Efficient Balanced Codes," IEEE Transactions on Information Theory, vol. 32, No. 1, pp. 51-53 (Jan. 1986).

Lo, C.-C., et al., "Novel Wireless Impulsive Power Transmission to Enhance the Conversion Efficiency for Low Input Power," IEEE MTT-S International Microwave Workshop Series on Innovative Wireless Power Transmission: Technologies, Systems, and Applications, pp. 55-58 (May 12-13, 2011).

\* cited by examiner

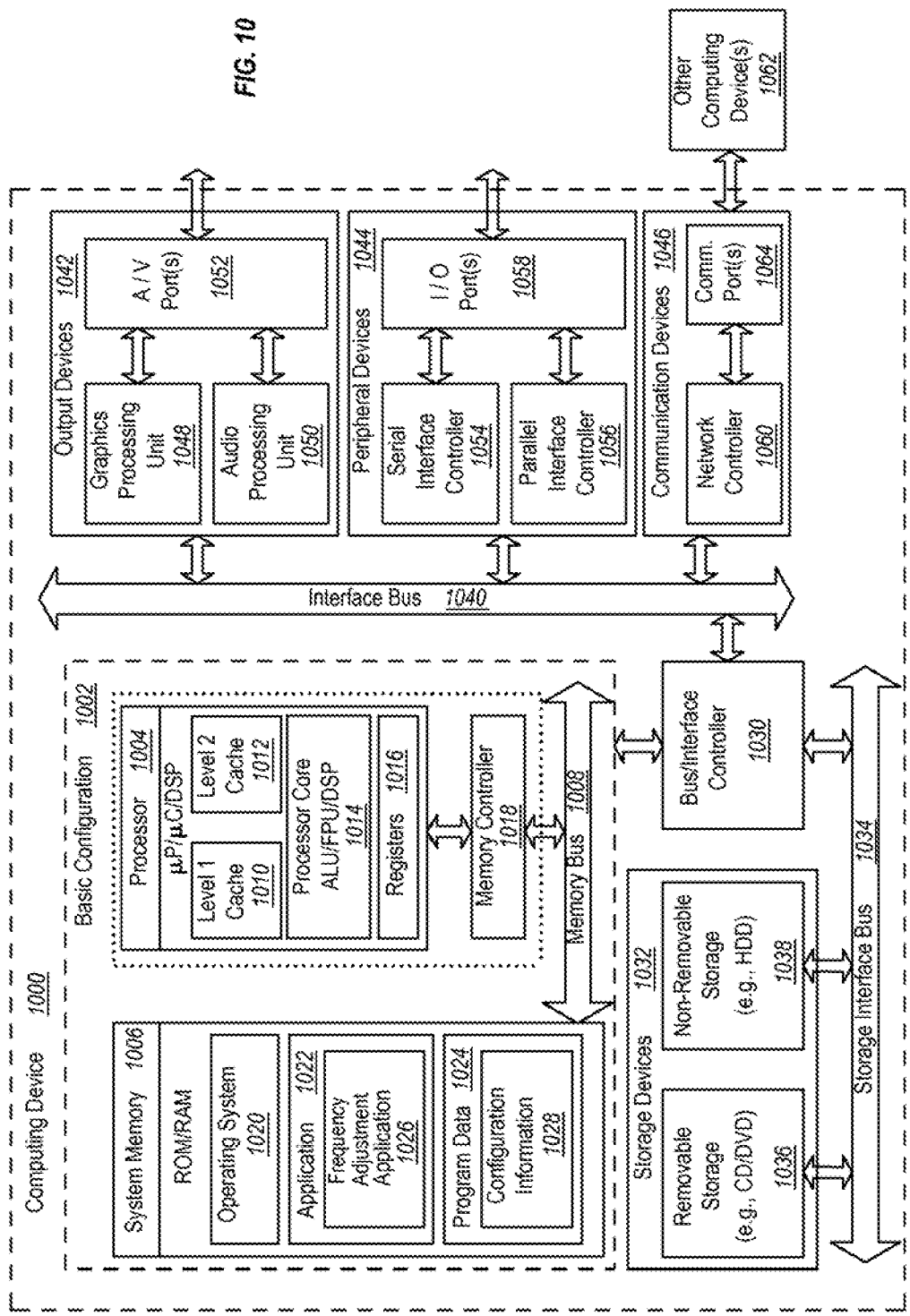

CONCURRENT WIRELESS POWER TRANSFER AND DATA COMMUNICATION

TECHNICAL FIELD

Example embodiments disclosed herein are generally, but not exclusively, related to wireless power transfer and data communication, for example for charging and transferring data to electronic devices such as mobile devices.

BACKGROUND INFORMATION

Unless otherwise indicated herein, the materials described in this section are not prior art to the claims in this application and are not admitted to be prior art by inclusion in this section.

In an increasingly mobile world, it may now be common for a user to have one or more mobile devices such as phones or laptop computers that he or she uses regularly while away from home or the office. Such mobile use of the devices may often involve use of a charged battery to power the devices. Prolonged use of the batteries may deplete the batteries, which then may be recharged in order to continue providing power to the devices.

In order to recharge the batteries, finding an electrical outlet or other suitable charging mechanism that is convenient to the user of a device may often be involved. However, even if a convenient electrical outlet can be found, the user should have a wired charger that is compatible with the device and that is also compatible with the electrical outlet. In many instances, the user may not have the wired charger with him or her because wired chargers can be bulky and thus not easy to carry around. In those instances where the user does have a wired charger, there may not be a compatible electrical outlet available for use, such as if the user is traveling in a foreign country.

BRIEF SUMMARY

Some embodiments disclosed herein relate to a system configured to provide both wireless power transfer and data communication using the same transmit signal to one or more mobile devices. An example system includes a constraint encoder that is configured to receive data bits for communication to the mobile devices and to encode the data bits onto a transmit signal. The constraint encoder is further configured to specify, based on the received data bits, signal constraints that cause the transmit signal to have a peak-to-power-average ratio (PAPR) during a given time interval sufficient to provide wireless power transfer to the mobile devices. The system also includes a signal generator coupled to the constraint encoder. The signal generator is configured to generate the transmit signal according to the signal constraints. The system further includes a transmitter coil that is coupled to the signal generator. The transmitter coil is configured to transmit the transmit signal that has been encoded with the data bits to receiver coils of the mobile devices. The encoded transmit signal is able to provide wireless power transfer and the encoded data bits to the mobile devices.

Some embodiments disclosed herein relate to a method that enables both wireless power transfer and data communication using a same transmit signal to mobile devices so that the mobile devices can be charged and receive the data communication concurrently. The method includes receiving data bits for communication to the mobile devices. The method further includes specifying, based on the received data bits, signal constraints that result in the transmit signal having a peak-to-power-average ratio (PAPR) during a given time interval sufficient to provide wireless power transfer to the mobile devices. The method also includes generating the transmit signal according to the signal constraints, encoding the data bits onto the transmit signal and transmitting the transmit signal that has been encoded with the data bits to the mobile devices to provide wireless power transfer and the encoded data bits to the mobile devices.

Some embodiments disclosed herein relate to a system that enables a mobile device to receive both wireless power transfer and data communication from a same received transmit signal. The system includes a receiver coil, implemented in a mobile device, that is configured to communicatively couple with a transmitter coil and to receive a transmit signal generated by the transmitter coil. The system further includes a converter coupled to the receiver coil and configured to extract power from the transmit signal received by the receiver coil. The system also includes a constraint decoder coupled to the receiver coil. The constraint decoder is configured to decode data bits encoded in the signal received by the receiver coil based on signal constraints that enable the transmit signal received by the receiver coil to transmit the data bits and to have a peak-to-power-average ratio (PAPR) during a given time interval sufficient to provide wireless power transfer to the mobile device.

Some embodiments disclosed herein relate to a method that enables a mobile device to receive both wireless power transfer and data communication from a same received transmit signal so that the mobile device can be charged and receive the data communication concurrently. The method includes receiving, at a receiver coil from a transmitter coil, a transmit signal, extracting power from the received transmit signal, and decoding data bits encoded in the received transmit signal based on signal constraints that enable the received transmit signal to transmit the data bits and to have a peak-to-power-average ratio (PAPR) during a given time interval sufficient to provide wireless power transfer to the mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 shows an example computing device that may be arranged to adjust the resonant frequency of a transmitter coil or receiver coil.

Figure 1:
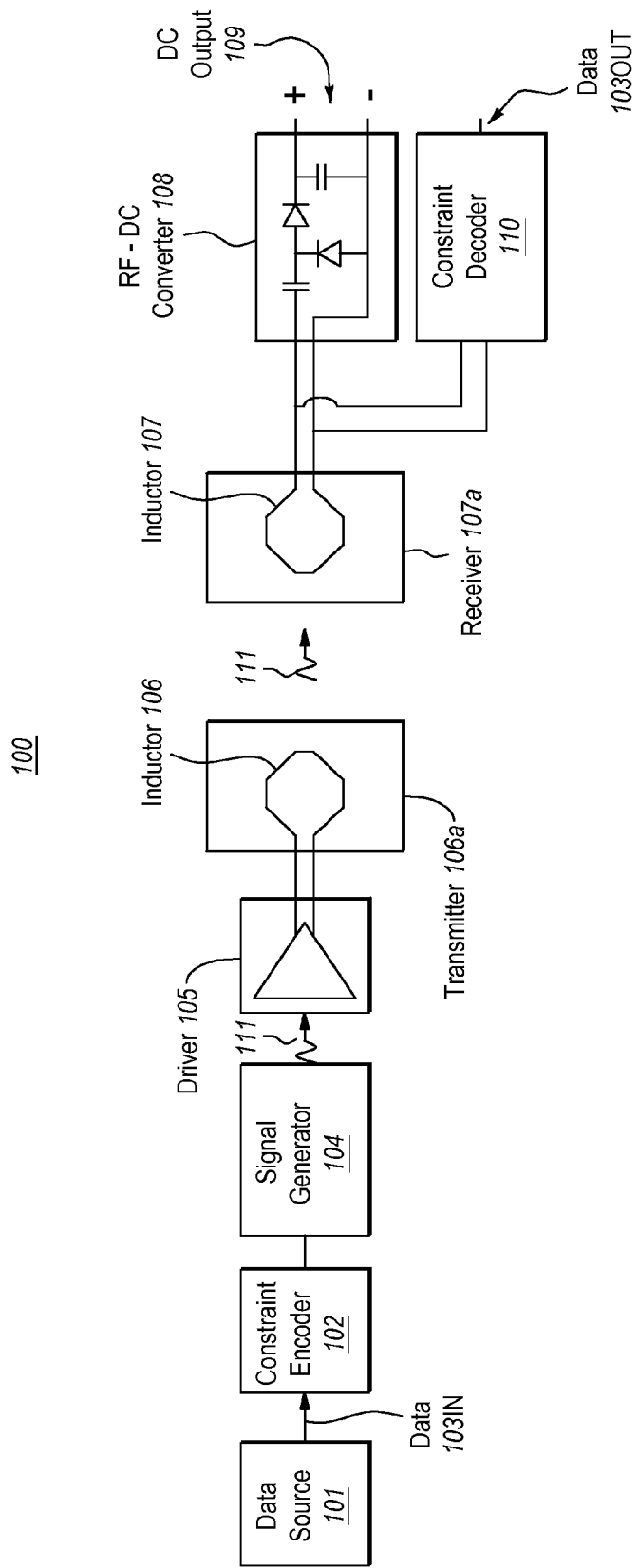
FIG. 1 is a schematic of an illustrative environment for a system to provide wireless power and a data communication to a mobile device.

All of the above are in accordance with various embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

Embodiments disclosed herein relate to a system that may be configured to provide both wireless power transfer and data communication using the same transmit signal to one or more mobile devices. In one embodiment, a system is provided which may include a constraint encoder that may be configured to receive data bits for communication to the mobile devices and to encode the data bits onto a transmit signal. The constraint encoder may be further configured to specify, based on the received data bits, signal constraints that cause the transmit signal to have a peak-to-power-average ratio (PAPR) during a given time interval sufficient to provide wireless power transfer to the mobile devices. The system also may include a signal generator coupled to the constraint encoder. The signal generator may be configured to generate the transmit signal according to the signal constraints. The system further may include a transmitter coil that is coupled to the signal generator. The transmitter coil may be configured to transmit the transmit signal that has been encoded with the data bits to receiver coils of the mobile devices. The encoded transmit signal may be able to provide wireless power transfer and the encoded data bits to the mobile devices.

Some embodiments disclosed herein relate to a method that may enable both wireless power transfer and data communication using a same transmit signal to mobile devices so that the mobile devices can be charged and receive the data communication concurrently. The method may include receiving data bits for communication to the mobile devices. The method further may include specifying, based on the received data bits, signal constraints that result in the transmit signal having a peak-to-power-average ratio (PAPR) during a given time interval sufficient to provide wireless power transfer to the mobile devices. The method also may include generating the transmit signal according to the signal constraints, encoding the data bits onto the transmit signal and transmitting the transmit signal that has been encoded with the data bits to the mobile devices to provide wireless power transfer and the encoded data bits to the mobile devices.

Some embodiments disclosed herein relate to a system that may enable a mobile device to receive both wireless power transfer and data communication from a same received transmit signal. The system may include a receiver coil, implemented in a mobile device, that may be configured to communicatively couple with a transmitter coil and to receive a transmit signal generated by the transmitter coil. The system further may include a converter coupled to the receiver coil and configured to extract power from the transmit signal received by the receiver coil. The system also may include a constraint decoder coupled to the receiver coil. The constraint decoder may be configured to decode data bits encoded in the signal received by the receiver coil based on signal constraints that enable the transmit signal received by the receiver coil to transmit the data bits and to have a peak-to-power-average ratio (PAPR) during a given time interval sufficient to provide wireless power transfer to the mobile device.

Some embodiments disclosed herein relate to a method that may enable a mobile device to receive both wireless power transfer and data communication from a same received transmit signal so that the mobile device can be charged and receive the data communication concurrently. The method may include receiving, at a receiver coil from a transmitter coil, a transmit signal, extracting power from the received transmit signal, and decoding data bits encoded in the received transmit signal based on signal constraints that enable the received transmit signal to transmit the data bits and to have a peak-to-power-average ratio (PAPR) during a given time interval sufficient to provide wireless power transfer to the mobile device.

FIG. 1 is a schematic illustration of an embodiment of an environment 100 for a system to provide wireless power to one or more mobile devices. As illustrated, the environment 100 may include modules and components that allow data received from a data source to be transmitted to a receiver. For example, data 103IN may be received from a data source 101. The data source may include a software or hardware data source, including a software application, a sensor, a data stream, or other type of data source. The data 103IN may be received wirelessly and/or over a wired connection. The data 103IN may then go through a variety of processes and components that cause the data to be transmitted by a transmitter 106a to a receiver 107a (of a mobile device), while at the same time, transferring power to the receiver 107a. In one embodiment, the transmitter 106a may include or otherwise be coupled to one or more of a constraint encoder 102, a signal generator 104, a driver 105, and an inductor 106, while the receiver 107a may include or otherwise be coupled to an inductor 107, an RF-DC converter 108, and a constraint decoder 110. In other embodiments, the transmitter 106a may include at least the inductor 106 and the receiver 107a may include at least the inductor 107.

In some embodiments, the transmitter 106a may include a matching network (not illustrated) that may match the inductor 106 to the driver 105. The receiver 107a may also include a matching network (not illustrated) that may match the inductor 107 to the RF-DC converter 108 and/or the constraint decoder 110. In other embodiments, the transmitter 106a and/or the receiver 107a may not utilize a matching network.

Wireless power transfer (WPT), as mentioned above, may be a technique for transferring energy to devices and equipment without physically connecting a cable to the devices/equipment. WPT may enable batteries of mobile devices, electric cars, or other devices to be charged wirelessly. One WPT embodiment may be based on electromagnetic or magnetic coupling between inductive loops or inductors (e.g., inductors 106 and 107 of FIG. 1). In such an embodiment, the inductor 106 of the transmitter 106a may be driven by a signal 111, which is then transmitted to the inductor 107 of the receiver 107a, so as to couple the inductors 106 and 107 to each other. The transmitted signal 111 that is transmitted by the transmitter 106a may be an AC signal with a frequency in the order of tens to hundreds of MHz's. At the receiver 107a, a RF-DC converter 108 coupled to the inductor 107 may be employed to recover the power received via the signal 111 and to generate a DC output signal 109, such as a voltage. The system of the environment 100 including the inductor 106 of the transmitter 106a and the inductor 107 of the receiver 107a may have a resonance frequency at which power transfer attains its largest or relatively largest efficiency.

In some embodiments, the efficiency of RF-DC converters (e.g., the RF-DC converter 108) may be improved when the transmitted signal 111 has a relatively large peak-to-average power-ratio (PAPR). An efficient way to create such signal may be by superimposing a set of sinusoidal signals with specific phase and frequency constraints. For example, a set of n sinusoidal signals may be used where the ith signal has frequency $f_i$ and phase $\phi_i$. The constraints may be such that the frequencies are equally spaced and the phase distributions are constant. These conditions can be written, for example, as $f_i = f_0 + i\Delta f$ and $\phi_{i+1} - \phi_i = \Delta\phi$, where $\Delta f$ and $\Delta\phi$ are a constant frequency and phase, respectively. Depending on the power levels, transfer efficiency may be improved by several decibels compared to conventional and/or other types of signals.

In the above embodiment, the transmitted signal 111 may not only carry power but also data. To achieve both efficient wireless power transfer and concurrent data communications, the transmitted signal 111 should have a large PAPR and should have the data encoded into it in an efficient manner. Embodiments included herein describe how to modulate the transmitted signal 111 in such a way that both efficient high-rate data communications and efficient wireless power transfer can be achieved concurrently. When using the term "concurrently" herein, the description intends to include operations, acts, or processes that could occur simultaneously or substantially simultaneously.

The transmitter 106a may transmit the signal 111 over inductor 106. The signal 111 includes a superposition of sinusoidal (cosines) signals that satisfy constraints on both frequency and phase to attain a relatively large PAPR during a time interval. The transmitted signal 111 may be modulated within these constraints to transfer data simultaneously with power in this time interval. For this purpose, the signal generator 104 may map a set of data bits to a set of waveforms where each of the waveforms may be a superposition of sinusoidal signals with the constraints satisfied. Some embodiments may include multiple different mappings. For instance, in a first mapping, a subset of a set of sinusoidal signals with linearly spaced frequencies and zero initial phase may be used to encode bits to transmitted signals. For this first mapping, the maximum or relatively higher signal value may be achieved at the beginning of the time interval. In a second mapping, the initial phases of a set of sinusoidal signals may be chosen in relation to the frequency from a discrete set. For this mapping, an additional number of bits may be transmitted in the interval. These mappings may be combined to further increase data rate. In this manner, the mappings enable simultaneous and efficient wireless power transfer and data communication.

As discussed previously, the wireless power transfer and data communications system of the environment 100 of FIG. 1 may include inductor 106 of the transmitter 106a and inductor 107 of the receiver 107a that are coupled together. This coupling allows power to be transferred from the inductor 106 of the transmitter 106a to the inductor 107 of the receiver 107a. As also discussed, the transmitter 106a and/or the receiver 107a may employ a matching network so that power transfer may be increased or maximized for a particular frequency. The driver 105 drives the inductor 106 of the transmitter 106a. The driver 105 may be a power amplifier that amplifies its input signal (e.g., signal 111). The signal received by the inductor 107 of the receiver 107a may be fed to the RF-DC converter 108 which may extract power from the signal 111. For this purpose, the RF-DC converter 108 may include a diode-based rectifier or other circuitry configured to perform the RF-DC conversion. Moreover, a charge pump may be used in some cases to increase the output voltage of the DC output 109.

The signal generator 104 may supply the input signal 111 to the driver 105. To enable both wireless power transfer and data communication, the signal generator 104 may produce consecutive blocks of signals where the signal in each block is the superposition of n sinusoidal signals where n is an integer. Furthermore, the length of a block may be denoted by T. For example, let $1_{[a,b]}(t)$ denote a function that is equal to 1 on the time interval [a,b] and 0 outside the interval [a,b]. The signal generated by the signal generator may be written as $$s(t) = \Sigma_j \Sigma_{i=0}^{n-1} A_{j,i} \cos(2\pi f_{j,i} t + \phi_{j,i}) \cdot 1_{[jT,(j+1)T]}. \quad [\text{Eqn.1}]$$

In the jth interval of T seconds, a set of n sinusoidal signals with frequency $f_{j,i}$, phase $\phi_{j,i}$ and amplitude $A_i$ may be superimposed by the signal generator 104 and input to the driver 105. The frequency $f_{j,i}$ and phase $\phi_{j,i}$ may be chosen in such a way that a signal with a relatively large PAPR may result in each interval of T seconds. This may be implemented by choosing the $f_{j,i}$ and $\phi_{j,i}$ in such a way that for the period of T seconds, the sinusoidal signals are in phase only once. For the time instant where this happens, the sinusoidal signals may constructively add up to lead to a relatively large or maximum amplitude. For the other time instances the signal may have smaller amplitude.

For each interval j, the values of $f_{j,i}$, $\phi_{j,i}$ and $A_i$ may be generated by the constraint encoder (CE) 102 based on a set of k data bits 103 that are to be transmitted during the interval. The constraint encoder 102 may encode the k data bits to values of $f_{j,i}$, $\phi_{j,i}$ and $A_i$ in a way that is efficient and satisfies various constraints including frequency, phase or amplitude. Such encoding may produce a signal with a relatively large PAPR, thereby providing efficient wireless power transfer. Examples of such efficient constraint encoders 102 are described below. At the receiver 107a, the constraint decoder (CD) 110 may perform the inverse process and may regenerate the k data bits (e.g., data 103OUT) based on the received signal 111.

In some embodiments, the system of the environment 100 as shown in FIG. 1 may implement additional features. For instance, a frame structure may be used to transmit the data. The transmitter 106a may group a set of N time intervals and add a specialized header to the signal transmitted. The receiver 107a may use this header to synchronize to the received signal 111. In one example, the signal generator 104 may superimpose a set of n sinusoidal signals in the jth time interval, where the frequency of the ith sinusoidal signal is $f_i$. The frequencies f that satisfy the constraint $f_i = f_0 + i\Delta f$ where $f_0$ and $\Delta f_i$ may be chosen arbitrarily or according to other implementations of constraint encoders as described below. The phase $\phi_i$ of the sinusoidal signals may either be chosen as 0 or as described in the constraint encoder 102 below.

One embodiment of a constraint encoder 102 may choose m out of the n signals to be transmitted during the jth time interval. Since there may be $\binom{n}{m}$ possible ways to choose m such signals, a number of $k = \log_2 \binom{n}{m}$ bits may be encoded into the transmitted signal. The m signals to be transmitted may be defined by choosing the amplitude $A_i$ of the n signals as either 0 or 1. When the amplitude $A_i$ is 1, the signal generator 104 may generate a corresponding sinusoidal signal with frequency $f_i$. When the amplitude $A_i$ is 0, the corresponding sinusoidal signal may not be generated by the signal generator 104.

In one embodiment, a process that implements the constraint encoder 102 and signal generator 104 may include receiving a set of k data bits, mapping the set of k data bits to a balanced vector x of size n with components 0 and 1, and generating a superposition of n sinusoidal signals where the amplitude of the ith sinusoidal signal depends on the ith component of x. As part of this process, k data bits (e.g., data 103IN) may be received that are to be transmitted. Continuing this process, these data bits may be mapped to a vector x of size n that may have components equal to 0 or 1 (as generally shown, for example, in FIG. 7, described below). Furthermore, the number of 1 s in the vector x may be equal to m. Effectively, the k bits may be mapped to a code word of a binary balanced code or binary constant weight code. Various codes and encodings may be used. Still further, a set of n sinusoidal signals may be superimposed according to Eqn. 1 where the components of x may be taken as the amplitudes of the sinusoidal signals. The resulting signal may contain the sinusoidal signals with frequency components that correspond to the 1 s of x.

In each time interval T, a set of m frequencies may be present. Since m may be constant for the different time intervals, the PAPR may be constant also. As such, the power transferred per time interval may not vary. This may be advantageous in that a varying power for different time intervals may lead to unwanted fluctuations at the output of the RF-DC converter 108 at the receiver. Moreover, it may be beneficial to choose the $f_i$ in such a way that over a time interval of T seconds, each of the sinusoidal signals traverses an integer number of periods. This may be achieved by choosing the $f_i$ as integer multiplies of 1/T, which itself may be accomplished by setting $f_0 = 1/T$. The constraint encoder 102 and signal generator 104, at least in one embodiment, may be implemented by a system 200 shown in FIG. 2.

Figure 2:
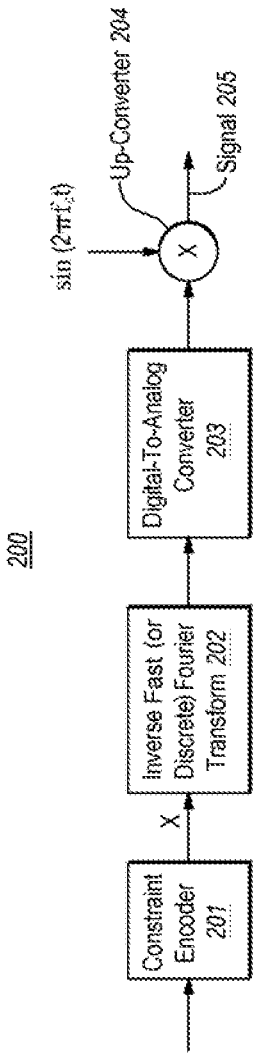
FIG. 2 is a schematic of an illustrative environment of a system that includes a constraint encoder and a signal generator.

Specifically, FIG. 2 is a schematic of an illustrative environment of the system 200 that includes a constraint encoder 201 and a signal generator. The signal generator may be configured to perform an inverse fast (or discrete) Fourier transform (IFFT) 202 and may include a digital to analog converter 203 and an up-converter 204 coupled to the digital to analog (DA) converter 203. The inputs to the constraint encoder 201 are the k data bits (e.g., 103IN from FIG. 1) to be transmitted. Using these data bits and one or more specified constraints (e.g., frequency, phase or amplitude), the constraint encoder 201 may generate the vector x. Based on the vector x, a real discrete-time signal may be generated by taking an inverse fast (or discrete) Fourier transform (IFFT) 202. This may be performed by letting the vector x define the positive and negative frequencies of a frequency domain signal and taking an IFFT of size at least 2 n. The digital to analog converter 203 may convert the discrete-time signal to a continuous-time signal. Finally, the up-converter 204 may mix the baseband signal 205 to the designated frequency range. The transmitter (e.g., 106a from FIG. 1) may employ additional filtering to reject for instance images present due to the mixing operation. At the receiver (e.g., 107a from FIG. 1), a reciprocal architecture may be implemented at the constraint decoder 110 to recover the information. An example schematic overview of such architecture may be shown in FIG. 3.

Figure 3:
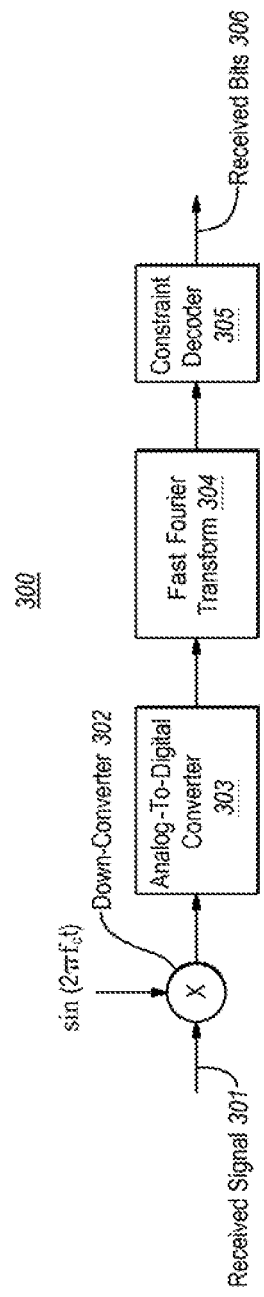
FIG. 3 is a schematic of an illustrative embodiment of recovering information from a received signal.

FIG. 3 is a schematic of an illustrative embodiment of recovering information from a received signal. The system of environment 300 of FIG. 3 receives a signal 301 which may be the same as signal 205 output by the up-converter 204 of FIG. 2. The received signal 301 may be fed to a down-converter 302 that mixes the signal down to the baseband. An analog-to-digital converter (ADC) 303 coupled to the down-converter 302 may convert the signal to a digital signal. A fast Fourier transform (FFT) 304 may be taken of a set of samples that corresponds to the time interval of T seconds. The FFT components may correspond to the different f and may be quantized to detect whether the corresponding frequency amplitude is 0 or 1. The resulting binary vector may be fed to a constraint decoder 305 that decodes the binary vector, resulting in received data bits 306.

In one example, the signal generator 104 of FIG. 1 may be able to generate a superposition of n=16 sinusoidal waveforms. The frequency $f_0$ of the lowest frequency sinusoidal waveform may be taken as $f_0 = 1$ MHz. Furthermore, in this example, the frequency spacing may be taken as $\Delta f = 1$ MHz. The time interval T may be chosen as T=1 us or a multiple of 1 us. This may ensure that the sinusoidal signals with frequencies ranging from 1 MHz to 16 MHz will traverse an integer number of periods. The value of m may be chosen as m=8. This may allow a number of $k = \log_2 \binom{n}{m} = 13.6$ bits to be transferred per period of T=1 us.

Figure 4:
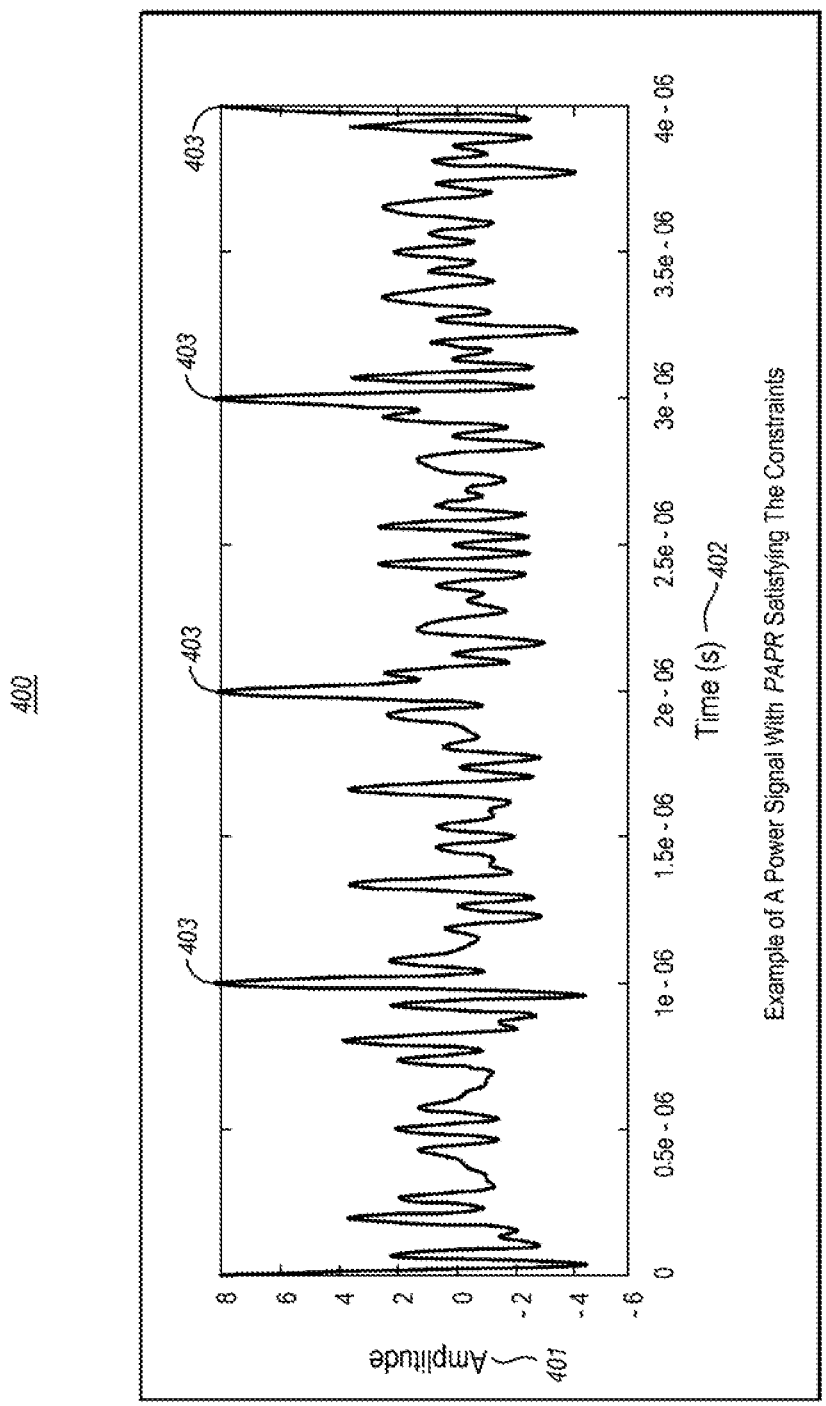
FIG. 4 illustrates an embodiment of a power signal with a PAPR satisfying one or more constraints.

FIG. 4 illustrates an embodiment of a power signal with a PAPR satisfying one or more constraints. Specifically, an example of a signal may be shown in graph 400 of FIG. 4 for four periods of T, where amplitude 401 may be shown on the Y-axis and time (s) may be shown on the X-axis. The corresponding vectors x for each of the periods may be given by [0 0 0 1 1 0 0 0 0 1 1 1 0 1 1 1], [1 1 1 0 0 1 0 0 1 0 1 1 0 0 1 0], [1 1 1 1 1 0 0 0 1 0 0 0 0 1 0 1], [0 1 1 0 0 1 0 0 0 0 1 1 0 1 1 1], respectively. Each of the sinusoidal signals may be in phase at the beginning of the period of T that leads to a relatively large peak (the peaks shown at points 403). Since, in this example, m=8, the amplitude of the peak is 8 as well. The PAPR of the signal shown in FIG. 4 is equal to 12 dB, which may be an improvement over a single sinusoidal waveform with a PAPR of 3 dB. Furthermore, data may be transmitted at a rate of about 13 Mb/s in parallel to the power transfer. The embodiment described above is only one example of a power signal with a PAPR that satisfies constraints, and it may be understood that the value of m=8 was chosen arbitrarily, and may be substantially any other value.

The value of m may determine the number of bits that may be encoded per time interval T. In some cases, the largest number of bits that may be encoded per time interval T may be achieved when m is equal to about n/2. On the other hand, when m is relatively close to n, the PAPR may be larger. As will be noted, the waveform of FIG. 4 may resemble an orthogonal frequency-division multiplexing OFDM waveform. In the embodiments described herein, the constraints that are applied on the phases and frequencies may be applied such that a relatively large PAPR may be achieved for each symbol interval of T seconds. This may enable the system to maintain an efficient power transfer. In OFDM scenarios, the PAPR is typically reduced or minimized, whereas in the systems of the embodiments described herein, PAPR may be increased or maximized in order to transfer a larger amount of data and achieve a larger efficiency of power transfer.

In one embodiment, the signal generator 104 of FIG. 1 may superimpose n sinusoidal signals according to Eqn. 1, where the ith signal has frequency $f_i$. Furthermore, the phase of the ith signal may be $\phi_{j,i}$ and may vary per time interval T. Information may be encoded by changing the values of $\phi_{j,i}$. Additional information may be encoded by choosing the value of $\phi_{j,i}$ as $$\phi_{j,i} = 2\pi f_i T_s,$$

where $T_s$ may be a time in the range [0,T]. Moreover, $T_s$ may be chosen from a fixed set S of size M=|S|. Each of the elements of S lies in the range [0,T]. This allows a constraint encoder to encode k=$\log_2(M)$ bits into a realization of $T_s$ from S.

A larger M may allow more bits to be encoded, but may also indicate that the phases of the $f_i$ are to be resolved with greater precision. As previously described, the system of the environment 300 of FIG. 3 may be used at a receiver such as the receiver 107a. The phases may be detected from the output of the FFT 304. In this case, only the phase of, for instance, a relatively lower or lowest frequency sinusoidal may be used to make the estimate for the phase. In another embodiment, the phase of several frequencies may be estimated and combined to generate the realization of $T_s$ and with that the value of the k data bits. The realization of the $T_s$ may also be detected in the time domain since, effectively, each of the sinusoidal signals may be shifted in time by $T_s$. Since each of the sinusoidal signals may be shifted by $T_s$, the location of the maximum peak may be at $T_s$.

Figure 5:
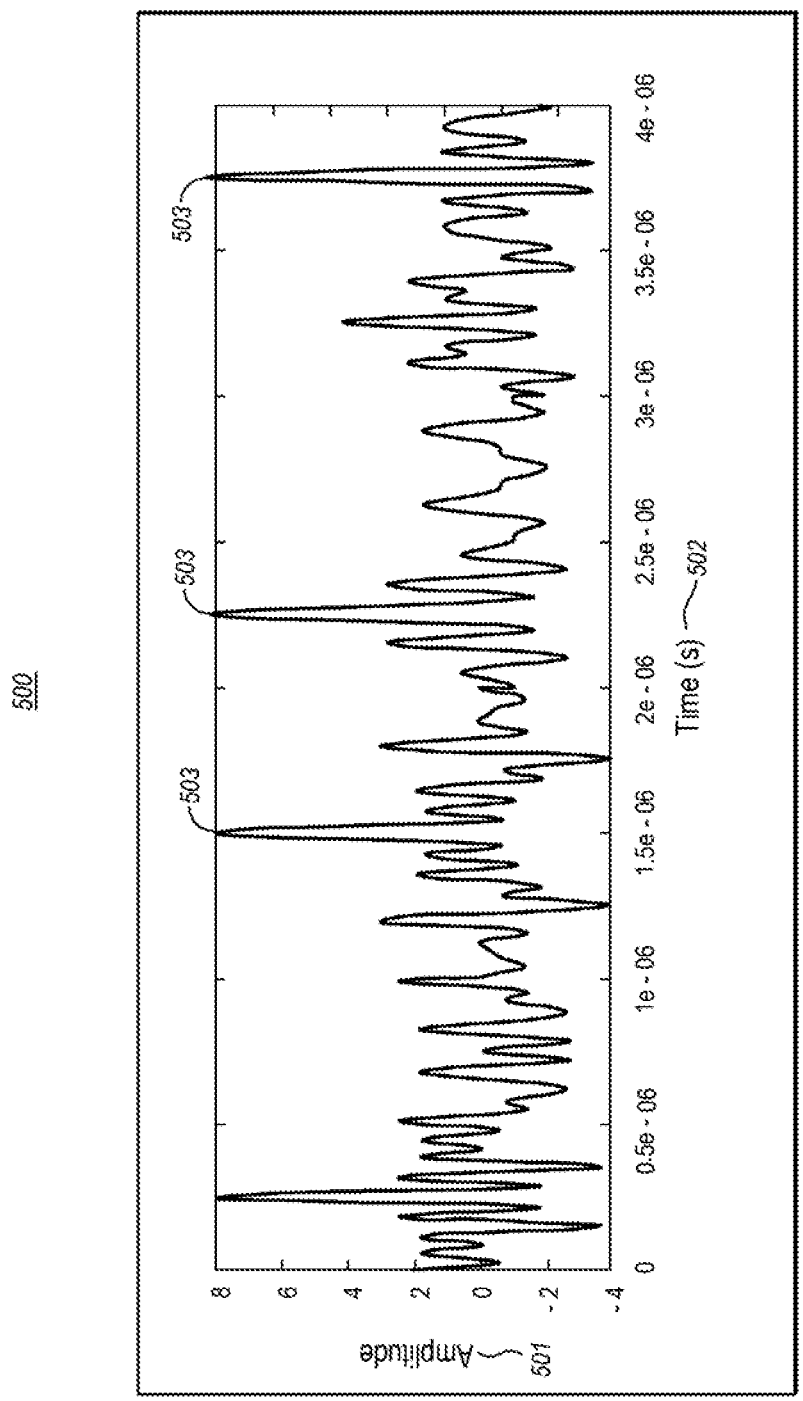
FIG. 5 illustrates an embodiment of a power signal that encodes bits of information per period using a set of frequencies and phases.

In one example where the signal generator 104 may be able to generate a superposition of n=16 sinusoidal waveforms, the parameters T, m, $f_i$, $\Delta f$ may be the same as in the example previously described in relation to FIG. 4. As with graph 400 of FIG. 4, amplitude may be shown on the Y-axis of graph 500 of FIG. 5, while time (s) may be shown on the X-axis. The set S, from which $T_s$ is chosen, may be given by S=[0, 0.25e-6, 0.5e-6, 0.75e-6]. This allows an additional two bits to be encoded into the power signal. An example of a resulting power signal is shown in FIG. 5. FIG. 5 illustrates an embodiment of a power signal that encodes bits of information per period using a set of frequencies and phases. The locations of the peaks 503 may be shifted in time, as compared to the peaks 403 of FIG. 4. The power signal of FIG. 5 may have the same PAPR as the power signal of FIG. 4 (12 dB). However, an additional number of bits (e.g., two bits) may also be encoded. This number may be further increased by using a larger value for M.

In some embodiments, amplification of a signal with a relatively large PAPR may involve the use of a specially-designed driver. Embodiments may be implemented where each of the sinusoidal signals may be generated separately, and combining of the signals may take places in one of the last stages of the driver. Other combinations for the design of RF power amplifiers may also be used. Moreover, a physical combining may also be performed for multi-sine signals for power transmission. This technique may be combined with the other techniques and embodiments disclosed herein for amplifying and combining signals.

Figure 6:
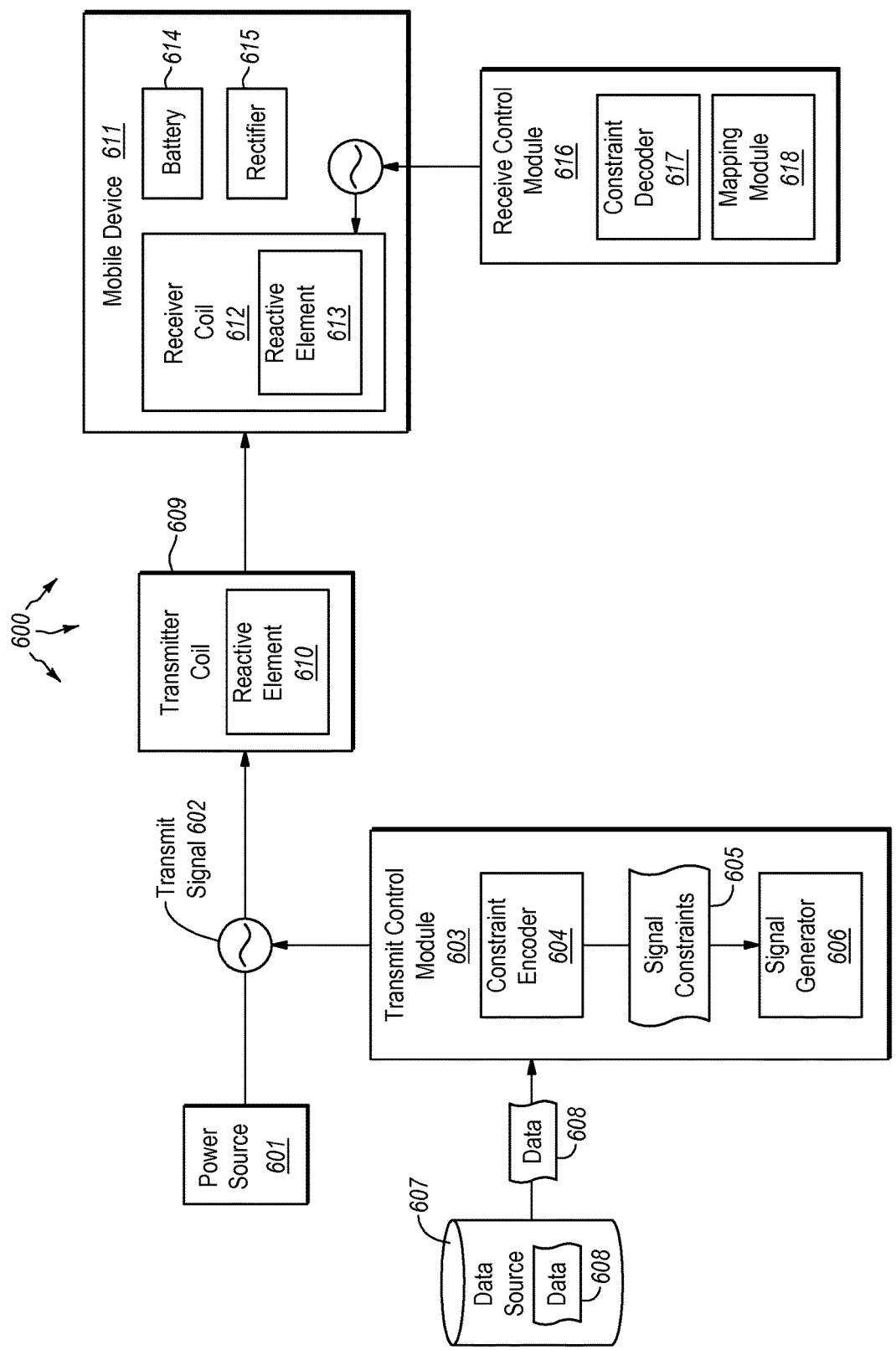
FIG. 6 illustrates a wireless power and data transmission environment in which power and data may be wirelessly transmitted to a receiver.

FIG. 6 illustrates a wireless power and data transmission environment in which power and data may be wirelessly transmitted to a receiver. As shown in FIG. 6, a wireless power transfer and data communication environment 600 may be provided and implemented. The environment 600 includes various modules and components which work together to concurrently transfer power and data to a receiver. For example, power and data may be transferred via a transmit signal 602. The transmit signal 602 may be controlled by the transmit control module 603. The transmit control module 603 may apply various signal constraints 605 to the transmit signal 602. For instance, the constraint encoder 604 of the transmit control module 603 may generate phase, frequency or amplitude constraints that are applied by the signal generator 606 when the signal generator generates the transmit signal 602. These signal constraints 605 may be applied to the transmit signal 602 in order to ensure a PAPR that may be large enough to efficiently transfer power. Indeed, the signal constraints 605 may be applied to achieve the amplitude peaks shown as element 403 in FIG. 4 and element 503 in FIG. 5.

In addition to the signal constraints 605, the signal generator 606 may further receive data 608 from a data source 607. The data source 607 may be any type of hardware or software data store that may be configured to provide data. The data may be received in bursts and then buffered by the transmit control module 603, or may be received as a stream of data. This data 608 may then be modulated into the transmit signal 602. The transmit signal 602 may thus be generated according to the signal constraints 605 provided by the constraint encoder 604, and further includes the data 608 received from the data source 607. This transmit signal 602 may then be sent to a transmitter coil 609 powered by a power source 601. The mobile device 611 may be electrically coupled with the transmitter coil 609. A reactive elements 610 of the transmit coil 609 may establish a magnetic field which, when sufficiently close to a reactive element 613 of a receiver coil 612 on the mobile device 611, enables wireless power transfer through induction.

After receiving power transferred via the transmit signal 602 from the transmitter coil 609, a rectifier 615 on the mobile device 611 may convert the RF energy to DC power. This power, if not immediately used by the mobile device 611, may be sent to a battery 614 for storage. The data 608 carried on the transmit signal 602 may be received at the receiver coil 612 according to controls implemented by a constraint decoder 617. The constraint decoder 617 and a mapping module 618 may work together to as part of a receive control module 616 to decode the data 608 received in the transmit signal 602. Thus, in this manner, the system of environment 600 of FIG. 6 may be implemented to concurrently transfer power and data from a transmitting device to a receiving device such as mobile device 611.

In one embodiment, a system may be provided that includes the constraint encoder 604. The constraint encoder 604 may be configured to receive the data bits 608 for communication to one or more mobile devices (e.g., mobile device 611) and to encode the data bits onto transmit signal 602. The constraint encoder 604 may further be configured to specify, based on the received data bits 608, one or more signal constraints 605 that cause the transmit signal 602 to have a peak-to-power-average ratio during a given time interval sufficient to provide wireless power transfer to the mobile device 611. The system also includes a signal generator 606 which may be coupled to the constraint encoder 604, and may further be configured to generate the transmit signal 602 according to the signal constraints 605. The system may also include a transmitter coil 609 that may be coupled to the signal generator 606 and may further be configured to transmit the transmit signal 602 that has been encoded with the data bits 608 to one or more receiver coils 612 of the mobile device 611. In this system, the encoded transmit signal 602 may be able to concurrently provide wireless power transfer and the encoded data bits to the mobile device 611.

In some embodiments, the system of environment 600 further includes a driver (e.g., power source 601) coupled between the signal generator 606 and the transmitter coil 609. The driver may be configured to drive the transmitter coil 609. The transmitter coil 609 may include an inductor (e.g., inductor 106 of FIG. 1) and potentially a matching network which may be configured to match the transmitter coil 609 to the signal generator 606. At least in some embodiments, the transmit signal 602 generated by the signal generator 606 may be a superposition of n sinusoidal signals, where n is an integer. To encode the received data bits 608, the constraint encoder 604 may be configured to encode the received data bits onto a subset m of the n sinusoidal signals. These n sinusoidal signals may have linearly spaced frequencies and zero initial phase difference. Moreover, to encode the received data bits, the constraint encoder 604 may be configured to encode the received data bits 608 onto a subset m of the n sinusoidal signals, which may have an initial phase chosen in relation to a frequency from a discrete set. At least in some cases, the initial phase chosen may be one of the signal constraints 605 applied by the signal generator 606 when generating the transmit signal 602.

The transmit signal may have a peak-to-power-average ratio sufficient to provide wireless power transfer at a beginning of a given time interval. Indeed, as shown in FIG. 4, peak power in the transmit signal may occur at each of the peaks 403 which occur at the beginning of each given time interval. The transmit signal 602 generated by the signal generator 606 may include consecutive blocks of signals. The consecutive blocks of signals may include a superposition of n sinusoidal signals, where n is an integer. At least in some embodiments, the duration of each signal block may be the given time interval. In some cases, the given time interval may be one microsecond, while in other cases, the time interval may be of a different duration. In some cases, the duration of the time interval may be selected by a user or by a software application or service.

Figure 7:
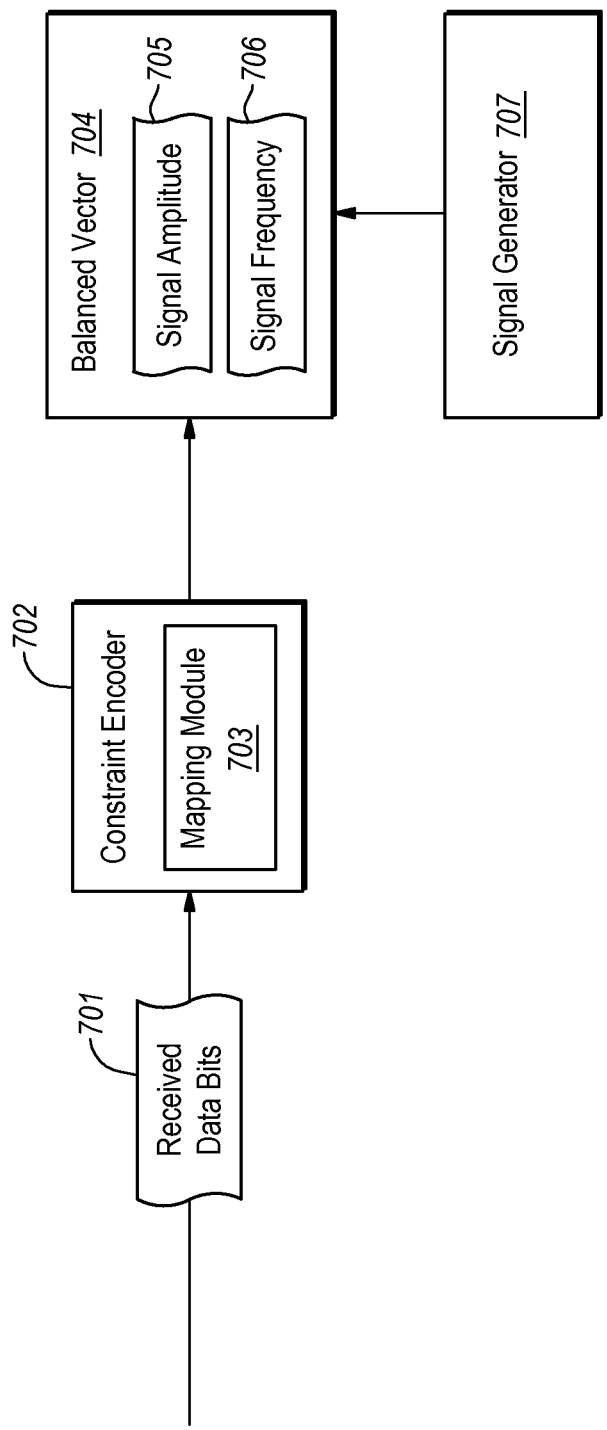
FIG. 7 illustrates an example of how data bits may be mapped to a balanced vector that includes a signal amplitude and a signal frequency.

FIG. 7 illustrates an example of how data bits may be mapped to a balanced vector that includes a signal amplitude and a signal frequency. As shown in FIG. 7, the constraint encoder may be configured to map received data bits to a balanced vector. For instance, a constraint encoder 702 may receive data bits 701. A mapping module 703 of the constraint encoder 702 may map the received data bits to balanced vector 704. The balanced vector 704 may specify a signal amplitude 705 and a signal frequency 706 for n sinusoidal signals. In such cases, a signal generator 707 may be configured to generate a transmit signal (e.g., signal 602 of FIG. 6) as a superposition of at least some of the n sinusoidal signals, where n is an integer, based on an amplitude specified in the balanced vector 704. The signal generator 707 may be further configured to generate the transmit signal as a subset m of the n sinusoidal signals, where the subset m includes those sinusoidal signals with a specified amplitude (e.g., an amplitude of 1).

In another embodiment, a system may be provided which enables a mobile device to receive both wireless power transfer and data communication from the same received transmit signal. This system may include a receiver coil 612, implemented in a mobile device 611, that may be configured to communicatively couple with a transmitter coil 609 and to receive a transmit signal 602 transmitted by the transmitter coil. The system may further include a converter (e.g., rectifier 615) coupled to the receiver coil 612 which may be configured to extract power from the transmit signal 602 received by the receiver coil 612. The rectifier 615 may be configured to deliver direct current to a rechargeable battery 614 of the mobile device 611. The system may also include the constraint decoder 617 coupled to the receiver coil 612 which may be configured to decode data bits 608 encoded in the signal received by the receiver coil based on signal constraints 605. This may enable the transmit signal 602 received by the receiver coil 612 to transmit the data bits and, further, to have a PAPR during a given time interval sufficient to provide wireless power transfer to the mobile device 611.

Figure 8:
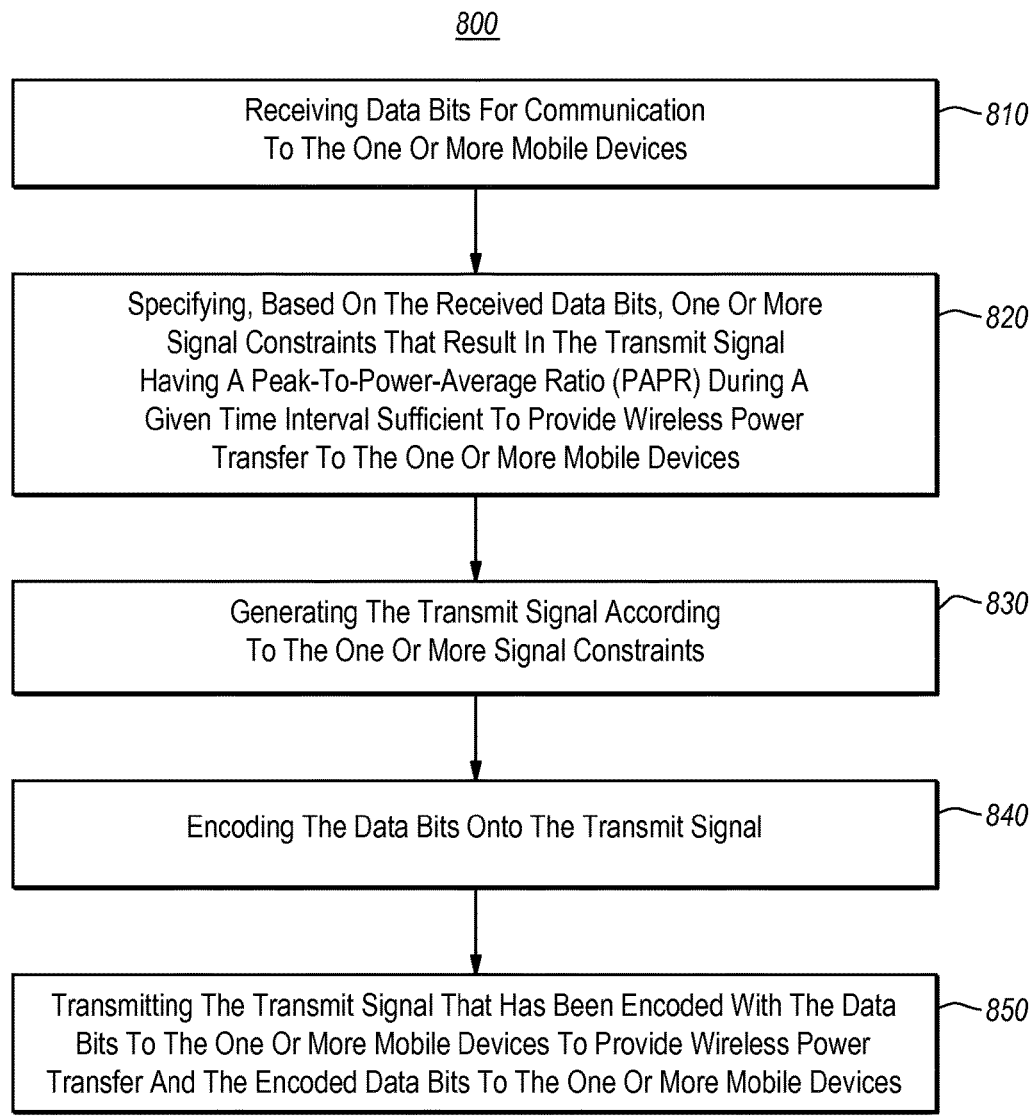
FIG. 8 is a flow diagram of an illustrative embodiment of a method to enable both wireless power transfer and data communication using the same transmit signal to mobile devices so that the mobile devices can be charged and receive the data communication concurrently.
Figure 9:
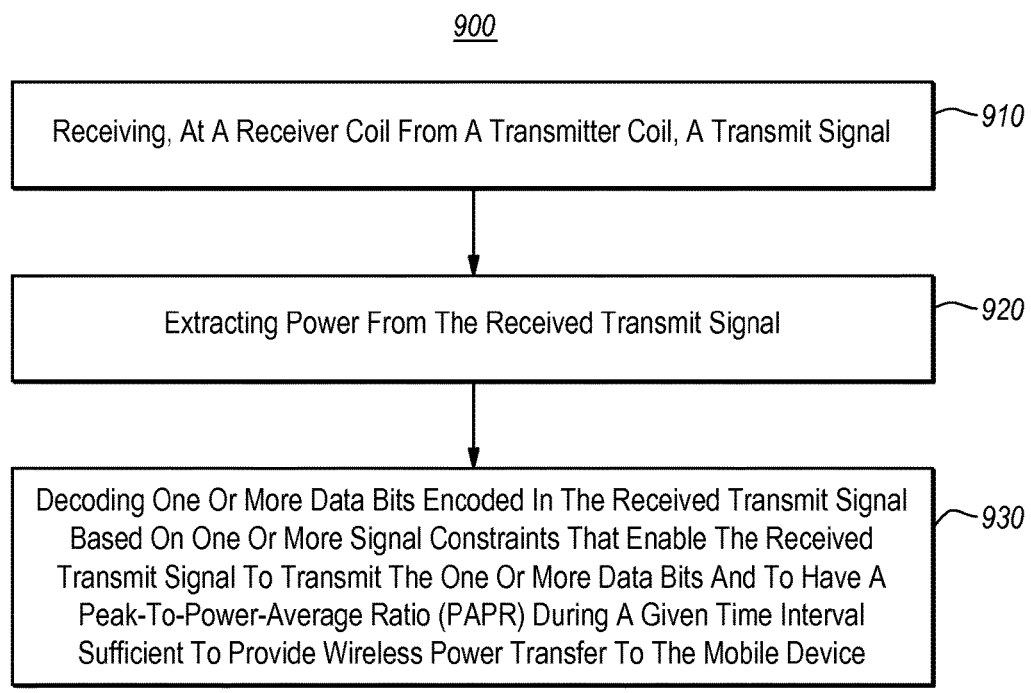
FIG. 9 is a flow diagram of an illustrative embodiment of a method that enables a mobile device to receive both wireless power transfer and data communication from a same received transmit signal so that the mobile device may be charged and receive the data communication concurrently.

As mentioned above with regards to FIG. 1, the inductor 107 of the receiver 107a may include a matching network configured to match the receiver to the RF-DC converter 108 and constraint decoder 110. The matching network of the inductor 107 of the receiver 107a may ensure that the RF-DC converter 108 and constraint decoder 110 are properly configured to receive both power and data from the transmit signal 111. Moreover, a constraint decoder (e.g., constraint decoder 110 of FIG. 1) may be configured to map the received data bits (e.g., data bits 103 of FIG. 1 or data bits 701 of FIG. 7) to the balanced vector 704 that specifies an amplitude 705 and frequency 706 for n superimposed sinusoidal signals. The constraint decoder may also be configured to decode the data bits 701 from the n superimposed sinusoidal signals, where n is an integer, based on amplitudes specified in the balanced vector 704. FIGS. 8 and 9 will now be described to illustrate methods for transferring and receiving wireless power and data simultaneously or concurrently.

FIG. 8 is a flow diagram of an illustrative embodiment of a method 800 to enable both wireless power transfer and data communication using the same transmit signal to various mobile devices so that the mobile devices can be charged and receive the data communication concurrently. The method 800, and other methods and processes described herein, set forth various blocks or actions that may be described as processes, functional operations, events and/or acts, etc., which may be performed by hardware, software, firmware, and/or combination thereof. The method 800 may include one or more operations as illustrated by blocks 810, 820, 830, 840 and 850 of FIG. 8.

In block 810 ("Receiving Data Bits For Communication To The One Or More Mobile Devices"), data bits for communicating to the mobile devices may be received at the transmit control module 603. For example, in one illustrative embodiment, data bits 608 may be received or accessed from a data source 607. The data source may be a local or remote database, or may be a network-accessible data store such as the internet or the cloud. The data may be accessed as needed, or may be accessed as the data becomes available. In such cases, the data may be buffered in a temporary data store. Indeed, in some cases, the data source 607 from which the transmit control module 603 receives data may be such a temporary data store.

In block 820 ("Specifying, Based On The Received Data Bits, One Or More Signal Constraints That Result In The Transmit Signal Having A Peak-To-Power-Average Ratio During A Given Time Interval Sufficient To Provide Wireless Power Transfer To The One Or More Mobile Devices"), the constraint encoder 604 may determine, select or otherwise specify signal constraints 605 that may be used when generating the transmit signal 602. The signal constraints may be based on the received data bits 608, and may be selected for the specific data that was received. Thus, in some cases, different types or forms of data may elicit the application of different signal constraints 605 by the signal generator. The signal constraints may be selected to ensure that the transmit signal 602 has a PAPR that may be relatively high enough to provide efficient wireless power transfer to the receiver coil 612 of the mobile device 611.

In block 830 ("Generating The Transmit Signal According To The One Or More Signal Constraints"), the signal generator 606 may generate the transmit signal 602 according to the signal constraints 605 specified by the constraint encoder 604. In block 840 ("Encoding The Data Bits Onto The Transmit Signal"), the constraint encoder 604 may encode the data bits 608 onto the transmit signal 602. In block 850 ("Transmitting The Transmit Signal That Has Been Encoded With The Data Bits To The One Or More Mobile Devices To Provide Wireless Power Transfer And The Encoded Data Bits To The One Or More Mobile Devices"), the transmitter coil 609 may transmit the signal 602 to the receiver coil 612 of the mobile device 611. The transmit signal may be encoded with the data bits 608 received from the data source 607. The transmit signal may also include power from power source 601. In this manner, power and data may be transferred simultaneously from a transmitter to a receiver.

In some cases, the method 800 may further include amplifying the transmit signal 602 prior to transmitting the signal to the mobile device 611. The transmit signal may be amplified by a driver or other power amplification device. During the generation of the transmit signal 602 itself, the signal may be generated to include a superposition of n sinusoidal signals, where n is an integer. The transmit signal may be generated to have a PAPR sufficient to provide wireless power transfer substantially at the beginning of the given time interval, as shown by the peaks 403 in FIG. 4. Additionally or alternatively, generating the transmit signal 602 may include generating the transmit signal to include consecutive blocks of signals. For example, the transmit signal may be generated by generator 606 to have consecutive blocks of signals that comprise a superposition of n sinusoidal signals, where n is an integer. The length or duration of each signal block may be the given time interval. This time interval may be 1 microsecond in some embodiments, and may be a different duration in other embodiments. In some cases, generating the transmit signal 602 may include generating the transmit signal as subset m of the n sinusoidal signals, where subset m includes those sinusoidal signals with an amplitude of 1.

Encoding the data bits 608 onto the transmit signal 602 may, at least in some embodiments, include encoding the received data bits onto a subset m of the n sinusoidal signals, which may have linearly spaced frequencies and zero initial phase difference. Still further, encoding the data bits onto the transmit signal may include encoding the received data bits onto a subset m of the n sinusoidal signals having an initial phase chosen in relation to a frequency from a discrete set. The received data bits 608 may be mapped by mapping module 618 to a balanced vector. For instance, as shown in FIG. 7, one or more received data bits 701 may be mapped by mapping module 703 to balanced vector 704, which specifies an amplitude 705 and frequency 706 for n sinusoidal signals. Generating the transmit signal may then include generating the transmit signal as a superposition of at least some of the n sinusoidal signals, where n is an integer, based on amplitudes 705 specified in the balanced vector 704.

FIG. 9 is a flow diagram of an illustrative embodiment of a method 900 to enable a mobile device to receive both wireless power transfer and data communication from a same received transmit signal so that the mobile device may be charged and receive the data communication concurrently. The method 900 may include one or more operations as illustrated by blocks 910, 920, and 930.

In block 910 ("Receiving, At A Receiver Coil From A Transmitter Coil, A Transmit Signal"), receiver coil 612 of the mobile device 611 may receive transmit signal 602. As described in method 800 of FIG. 8, the transmit signal 602 may include both a power component and a data component. Indeed, the transmit signal 602 may include power from power source 601 and data 608 from data source 607. In block 920 ("Extracting Power From The Received Transmit Signal"), a converter such as rectifier 615 may be used to extract power wirelessly transferred over the transmit signal 602. The converter may divert the converted DC power to a battery 614 for storage if the power is not immediately used to power the mobile device 611.

In block 930 ("Decoding One Or More Data Bits Encoded In The Received Transmit Signal Based On One Or More Signal Constraints That Enable The Received Transmit Signal To Transmit The One Or More Data Bits And To Have A Peak-To-Power-Average Ratio During A Given Time Interval Sufficient To Provide Wireless Power Transfer To The Mobile Device"), the constraint decoder 617 of the receive control module 616 may decode the data bits 608 that were encoded in the transmit signal 602. To perform the decoding, the constraint decoder 617 may identify signal constraints 605 that were used to encode the data 608 onto the transmit signal 602.

In some cases, decoding the data bits 608 may include mapping the received data bits to a balanced vector that specifies an amplitude and frequency for n superimposed sinusoidal signals. The mapping may identify an amplitude and a frequency for each of the n superimposed sinusoidal signals, where n is an integer. Once the mapping has been performed, the data bits may be decoded from the data bits of the n superimposed sinusoidal signals using the mapping. Indeed, the constraint decoder may use the amplitudes specified in the balanced vector to perform the decoding, as these amplitudes will indicate whether the data bit is a 1 or a 0. Furthermore, using these mappings, the constraint decoder 617 may decode a subset m of the n sinusoidal signals, where the subset m includes those sinusoidal signals with an amplitude of 1.

For this and other processes and methods disclosed herein, the operations performed in the processes and methods may be implemented in differing order. Furthermore, the outlined operations are only provided as examples, and some of the operations may be optional, combined into fewer operations, supplemented with further operations, or expanded into additional operations without detracting from the essence of the disclosed embodiments.

FIG. 10 shows an example computing device 1000 that may be arranged for transferring and/or receiving wireless power and data concurrently in accordance with the present disclosure, including adjustment of a resonant frequency of a transmitter coil or receiver coil. In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor (μP), a microcontroller (μC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include frequency adjustment application 1026 that may be arranged to perform at least some of the operations as described herein S including at least some of those described with respect to methods 800-900 of FIGS. 8 and 9. Program data 1024 may include configuration information 1028 that may be useful control or configure a transmit or receiver coil, and/or may include other information usable and/or generated by the various other modules/components described herein. The configuration information 1028 may also constraint information for determining the desired PAPR or the like. In some embodiments, application 1022 may be arranged to operate with program data 1024 on operating system 1020 such that optical components are formed and reconfigured as described herein. This described basic configuration 1002 may be illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

In some embodiments, a system may be provided which enables both wireless power transfer and data communication by use of the same transmit signal to various mobile devices. The system includes a constraint encoder that may be configured to receive data bits for communication to the mobile devices and to encode the data bits onto a transmit signal. The constraint encoder may further be configured to specify, based on the received data bits, signal constraints that cause the transmit signal to have a specified peak-topower-average ratio (PAPR) during a given time interval sufficient to provide wireless power transfer to the one or more mobile devices. The system also includes a signal generator coupled to the constraint encoder which may be configured to generate the transmit signal according to the signal constraints. The system further includes a transmitter coil that may be coupled to the signal generator and may be configured to transmit the transmit signal that has been encoded with the data bits to the receiver coils of the mobile devices. The encoded transmit signal may be able to provide wireless power transfer and the encoded data bits to the mobile devices.

In some examples, the system may further include a driver coupled between the signal generator and the transmitter coil. The driver may be configured to drive the transmitter coil. The transmitter coil may include a matching network configured to match the transmitter coil to the signal generator. In some cases, the transmit signal generated by the signal generator includes a superposition of n sinusoidal signals, where n is an integer. To encode the received data bits, the constraint encoder may be configured to encode the received data bits onto a subset m of the n sinusoidal signals, which have linearly spaced frequencies and zero initial phase difference. Furthermore, the transmit signal may be configured to have a PAPR sufficient to provide wireless power transfer at a beginning of the given time interval. Additionally or alternatively, to encode the received data bits, the constraint encoder may be configured to encode the received data bits onto a subset m of the n sinusoidal signals, which may have an initial phase chosen in relation to a frequency from a discrete set.

In some examples, the transmit signal generated by the signal generator includes consecutive blocks of signals. The consecutive blocks of signals may include a superposition of n sinusoidal signals, where n is an integer. In some cases, the duration of each signal block may be the given time interval. This time interval may be one microsecond, approximately one microsecond or some other time interval. In some embodiments, the time interval may be specified by a user or a software application. The signal constraints used by the system may include a frequency, a phase, an amplitude, or other constraints.

In some cases, the constraint encoder may be configured to map the received data bits to a balanced vector that specifies an amplitude and frequency for n sinusoidal signals. The signal generator may further be configured to generate the transmit signal as a superposition of at least some of the n sinusoidal signals, where n is an integer, based on an amplitude specified in the balanced vector. The signal generator may also be configured to generate the transmit signal as a subset m of the n sinusoidal signals, where the subset m includes those sinusoidal signals with an amplitude of 1.

One embodiment disclosed herein provides a method to enable both wireless power transfer and data communication using a same transmit signal to mobile devices so that the mobile devices may be charged and receive the data communication concurrently. The method includes receiving data bits for communication to the mobile devices, specifying, based on the received data bits, signal constraints that result in the transmit signal having a peak-to-power-average ratio during a given time interval sufficient to provide wireless power transfer to the one or more mobile devices, generating the transmit signal according to the signal constraints, encoding the data bits onto the transmit signal, and transmitting the transmit signal that has been encoded with the data bits to the mobile devices to provide wireless power transfer and the encoded data bits to the mobile devices. In some examples, the method may further include amplifying the transmit signal prior to transmitting the signal to the mobile devices.

In some cases regarding this method, generating the transmit signal comprises generating the transmit signal to include a superposition of n sinusoidal signals, where n is an integer. Encoding the data bits onto the transmit signal may include encoding the (received data bits onto a subset m of the n sinusoidal signals, which have linearly spaced frequencies and zero initial phase difference. Moreover, generating the transmit signal may include generating the transmit signal to have the PAPR sufficient to provide wireless power transfer substantially at a beginning of the given time interval. Encoding the data bits onto the transmit signal may include encoding the received data bits onto a subset m of the n sinusoidal signals having an initial phase chosen in relation to a frequency from a discrete set.

In some examples, generating the transmit signal includes generating the transmit signal such that it includes consecutive blocks of signals. In other examples, generating the transmit signal to include consecutive blocks of signals may include generating the transmit signal to have consecutive blocks of signals that comprise a superposition of n sinusoidal signals, where n is an integer. In some cases, a length of each signal block may be the given time interval. This time interval may be one microsecond, or may be approximately one microsecond. The signal constraints referenced in the above method may include a frequency, a phase, an amplitude or other constraints. The method may further include mapping the received data bits to a balanced vector that specifies an amplitude and frequency for n sinusoidal signals, such that generating the transmit signal includes generating the transmit signal as a superposition of at least some of the n sinusoidal signals, where n is an integer, based on amplitudes specified in the balanced vector. In such cases, generating the transmit signal may include generating the transmit signal as subset m of the n sinusoidal signals, where subset m includes those sinusoidal signals with an amplitude of one.

In another embodiment, a system may be provided which enables a mobile device to receive both wireless power transfer and data communication from a same received transmit signal. The system may include a receiver coil, implemented in a mobile device, that may be configured to communicatively couple with a transmitter coil and to receive a transmit signal generated by the transmitter coil. The system may further include a converter coupled to the receiver coil and configured to extract power from the transmit signal received by the receiver coil. Still further, the system may include a constraint decoder coupled to the receiver coil. The constraint decoder may be configured to decode data bits encoded in the signal received by the receiver coil based on signal constraints that enable the transmit signal received by the receiver coil to transmit the data bits and to have a peak-to-power-average ratio during a given time interval sufficient to provide wireless power transfer to the mobile device.

In this system, the converter may include a rectifier that may be configured to deliver direct current to a rechargeable battery of the mobile device. Still further, the receiver coil may include a matching network configured to match the receiver coil to the converter and constraint decoder. The constraint decoder may be configured to map the received data bits to a balanced vector that specifies an amplitude and frequency for n superimposed sinusoidal signals. The constraint decoder may be configured to decode the data bits from the n superimposed sinusoidal signals, where n is an integer, based on amplitudes specified in the balanced vector.

In another embodiment, a method may be provided which enables a mobile device to receive both wireless power transfer and data communication from a same received transmit signal so that the mobile device can be charged and receive the data communication concurrently. The method may include receiving, at a receiver coil from a transmitter coil, a transmit signal, extracting power from the received transmit signal, and decoding data bits encoded in the received transmit signal based on signal constraints that enable the received transmit signal to transmit the data bits and to have a peak-to-power-average ratio during a given time interval sufficient to provide wireless power transfer to the mobile device. In some cases, extracting power from the received transmit signal may include providing the power to charge a battery of the mobile device. The mobile device may be electrically coupled with the transmitter coil. Decoding data bits may include mapping the received data bits to a balanced vector that specifies an amplitude and frequency for n superimposed sinusoidal signals and decoding the data bits from the n superimposed sinusoidal signals, where n is an integer, based on the amplitudes specified in the balanced vector. In some cases, decoding the data bits may further include decoding a subset m of the n sinusoidal signals, where the subset m includes those sinusoidal signals with an amplitude of one.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated"

such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed:

1. A system to enable both wireless power transfer and data communication by use of a same transmit signal to one or more mobile devices, the system comprising:
   a constraint encoder that is configured to receive data bits for communication to the one or more mobile devices and to encode the data bits onto a transmit signal;
   the constraint encoder further configured to specify, based on the received data bits, one or more signal constraints that change frequency, phase, or amplitude components of the transmit signal to cause the transmit signal to have at least a specified peak-to-power-average ratio (PAPR) during a given time interval sufficient to provide the wireless power transfer to the one or more mobile devices, wherein the specified one or more signal constraints are selected to maintain the specified PAPR during the given time interval;
   a signal generator coupled to the constraint encoder and configured to generate the transmit signal according to the one or more signal constraints; and
   a transmitter coil that is coupled to the signal generator and is configured to transmit the transmit signal that has been encoded with the data bits to one or more receiver coils of the one or more mobile devices, the encoded transmit signal able to provide the wireless power transfer and the encoded data bits to the one or more mobile devices.

2. The system of claim 1, further comprising:
a driver coupled between the signal generator and the transmitter coil and configured to drive the transmitter coil.

3. The system of claim 1, wherein the transmitter coil includes a matching network configured to match the transmitter coil to the signal generator.

4. The system of claim 1, wherein the transmit signal generated by the signal generator comprises a superposition of n sinusoidal signals, wherein n is an integer.

5. The system of claim 4, wherein to encode the received data bits, the constraint encoder is configured to encode the received data bits onto a subset m of the n sinusoidal signals, which have linearly spaced frequencies and zero initial phase difference.

6. The system of claim 5, wherein the transmit signal has the specified PAPR sufficient to provide the wireless power transfer at a beginning of the given time interval.

7. The system of claim 4, wherein to encode the received data bits, the constraint encoder is configured to encode the received data bits onto a subset m of the n sinusoidal signals, which have an initial phase chosen in relation to a frequency from a discrete set.

8. The system of claim 1, wherein the transmit signal generated by the signal generator comprises consecutive blocks of signals.

9. The system of claim 8, wherein the consecutive blocks of signals comprise a superposition of n sinusoidal signals, wherein n is an integer.

10. The system of claim 9, wherein a duration of each block of signal is the given time interval.

11. The system of claim 10, wherein the given time interval is 1 microsecond.

12. The system of claim 1, wherein the given time interval is 1 microsecond.

13. The system of claim 1, wherein the one or more signal constraints include one or more of frequency, phase, and amplitude.

14. The system of claim 1, wherein the constraint encoder is configured to map the received data bits to a balanced vector that specifies an amplitude and frequency for n sinusoidal signals, and wherein the signal generator is configured to generate the transmit signal as a superposition of at least some of the n sinusoidal signals, wherein n is an integer, based on the amplitude specified in the balanced vector.

15. The system of claim 14, wherein the signal generator is configured to generate the transmit signal as a subset m of the n sinusoidal signals, wherein the subset m includes those sinusoidal signals with an amplitude of 1.

16. A method to enable both wireless power transfer and data communication using a same transmit signal to one or more mobile devices so that the one or more mobile devices can be charged and receive the data communication concurrently, the method comprising:
receiving data bits for communication to the one or more mobile devices;
specifying, based on the received data bits, one or more signal constraints that change frequency, phase, or amplitude components of the transmit signal, resulting in the transmit signal having at least a specified peak-to-power-average ratio (PAPR) during a given time interval sufficient to provide the wireless power transfer to the one or more mobile devices, wherein the specified one or more signal constraints are selected to maintain the specified PAPR during the given time interval;
generating the transmit signal according to the one or more signal constraints;
encoding the data bits onto the transmit signal; and
transmitting the transmit signal that has been encoded with the data bits to the one or more mobile devices to provide the wireless power transfer and the encoded data bits to the one or more mobile devices.

17. The method of claim 16, further comprising:
amplifying the transmit signal prior to transmitting the signal to the one or more mobile devices.

18. The method of claim 17, wherein generating the transmit signal comprises generating the transmit signal to include a superposition of n sinusoidal signals, wherein n is an integer.

19. The method of claim 18, wherein encoding the data bits onto the transmit signal comprises encoding the received data bits onto a subset m of the n sinusoidal signals, which have linearly spaced frequencies and zero initial phase difference.

20. The method of claim 19, wherein generating the transmit signal includes generating the transmit signal to have the specified PAPR sufficient to provide the wireless power transfer at a beginning of the given time interval.

21. The method of claim 18, wherein encoding the data bits onto the transmit signal comprises encoding the received data bits onto a subset m of the n sinusoidal signals having an initial phase chosen in relation to a frequency from a discrete set.

22. The method of claim 16, wherein generating the transmit signal comprises generating the transmit signal to include consecutive blocks of signals.

23. The method of claim 22, wherein generating the transmit signal to include consecutive blocks of signals includes generating the transmit signal to have consecutive blocks of signals that comprise a superposition of n sinusoidal signals, wherein n is an integer.

24. The method of claim 23, wherein a length of each block of signal is the given time interval.

25. The method of claim 23, wherein the given time interval is 1 microsecond.

26. The method of claim 16, wherein the given time interval is 1 microsecond.

27. The method of claim 16, wherein the one or more signal constraints include one or more of frequency, phase, and amplitude.

28. The method of claim 16, further comprising:
mapping the received data bits to a balanced vector that specifies an amplitude and frequency for n sinusoidal signals,
wherein generating the transmit signal includes generating the transmit signal as a superposition of at least some of the n sinusoidal signals, wherein n is an integer, based on the amplitudes specified in the balanced vector.

29. The method of claim 28, wherein:
generating the transmit signal includes generating the transmit signal as subset m of the n sinusoidal signals, wherein the subset m includes those sinusoidal signals with an amplitude of 1.

30. A system to enable a mobile device to receive both wireless power transfer and data communication from a same received transmit signal, the system comprising:
a receiver coil, implemented in the mobile device, that is configured to communicatively couple with a transmitter coil and to receive a transmit signal generated by the transmitter coil;

a converter coupled to the receiver coil and configured to extract power from the transmit signal received by the receiver coil; and a constraint decoder coupled to the receiver coil and configured to decode one or more data bits encoded in the transmit signal received by the receiver coil based on one or more signal constraints that change frequency, phase, or amplitude components of the transmit signal, so as to enable the transmit signal received by the receiver coil to transmit the one or more data bits and to have at least a specified peak-to-power-average ratio (PAPR) during a given time interval sufficient to provide the wireless power transfer to the mobile device, wherein the one or more signal constraints are selected to maintain the specified PAPR during the given time interval.

31. The system of claim 30, wherein the converter comprises a rectifier that is configured to deliver direct current to a rechargeable battery of the mobile device.

32. The system of claim 31, wherein the receiver coil includes a matching network configured to match the receiver coil to the converter and constraint decoder.

33. The system of claim 32, wherein the constraint decoder is configured to map the received data bits to a balanced vector that specifies an amplitude and frequency for n superimposed sinusoidal signals, and wherein the constraint decoder is configured to decode the data bits from the n superimposed sinusoidal signals, wherein n is an integer, based on the amplitudes specified in the balanced vector.

34. A method to enable a mobile device to receive both wireless power transfer and data communication from a same received transmit signal so that the mobile device can be charged and receive the data communication concurrently, the method comprising:

receiving, at a receiver coil from a transmitter coil, a transmit signal;

extracting power from the received transmit signal; and decoding one or more data bits encoded in the received transmit signal based on one or more signal constraints that change frequency, phase, or amplitude components of the transmit signal, enabling the received transmit signal to transmit the one or more data bits and to have at least a specified peak-to-power-average ratio (PAPR) during a given time interval sufficient to provide the wireless power transfer to the mobile device, wherein the one or more signal constraints are selected to maintain the specified PAPR during the given time interval.

35. The method of claim 34, wherein extracting power from the received transmit signal comprises providing the power to charge a battery of the mobile device.

36. The method of claim 34, wherein decoding one or more data bits comprises:

mapping the received one or more data bits to a balanced vector that specifies an amplitude and frequency for n superimposed sinusoidal signals; and decoding the one or more data bits from the n superimposed sinusoidal signals, wherein n is an integer, based on the amplitudes specified in the balanced vector.

37. The method of claim 36, wherein decoding the one or more data bits further comprises:

decoding a subset m of the n sinusoidal signals, where the subset m includes those sinusoidal signals with an amplitude of 1.

38. The method of claim 34, wherein the mobile device is electrically coupled with the transmitter coil.

\* \* \* \* \*

UNITED STATES PATENT AND TRADEMARK OFFICE
CERTIFICATE OF CORRECTION

PATENT NO.          : 9,602,955 B2                              Page 1 of 1
APPLICATION NO.     : 14/717498
DATED               : March 21, 2017
INVENTOR(S)         : Cronie et al.

It is certified that error appears in the above-identified patent and that said Letters Patent is hereby corrected as shown below:

In the Specification

In Column 7, Line 15, delete "frequencies f" and insert -- frequencies $f_i$ --, therefor.

In Column 7, Line 43, delete "1 s" and insert -- 1s --, therefor.

In Column 7, Line 51, delete "1 s" and insert -- 1s --, therefor.

In Column 8, Line 15, delete "2 n." and insert -- 2n. --, therefor.

In Column 8, Line 36, delete "different f" and insert -- different $f_i$ --, therefor.

In Column 15, Line 37, delete "herein S including" and insert -- herein including --, therefor.

In Column 18, Line 9, delete "the (received" and insert -- the received --, therefor.

In Column 21, Line 52, delete "at a least" and insert -- at least --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*